United States Patent [19]

St. Clair

[11] 4,097,378
[45] Jun. 27, 1978

[54] MULTIPLE EFFECT EVAPORATION OF WATER FROM WATER CONTAINING COMBUSTIBLE SLUDGES

[76] Inventor: John Craig St. Clair, Box 216 Rte. 5, London, Ohio 43140

[21] Appl. No.: 780,064

[22] Filed: Mar. 22, 1977

Related U.S. Application Data

[63] Continuation of Ser. No. 618,048, Sep. 30, 1975, abandoned.

[51] Int. Cl.² .............................................. B01D 12/00
[52] U.S. Cl. .......................................... 210/67; 34/9; 34/15; 159/1 RW; 159/DIG. 33; 203/DIG. 5; 208/13; 208/145; 210/59; 210/68; 210/71; 210/74; 210/78
[58] Field of Search ................... 34/9, 15; 210/59, 60, 210/61, 65, 66, 67, 68, 70, 71, 72, 74, 78, 50, 73 R, 73 S; 203/DIG. 5; 208/142, 144, 145, 13; 159/DIG. 33, 1 RW

[56] References Cited

U.S. PATENT DOCUMENTS 3,304,991  2/1967  Greenfield ..................... 159/1 RW
3,855,079  12/1974  Greenfield et al. ............. 159/1 RW Primary Examiner—Frank Sever

[57] ABSTRACT

Water containing combustible sludges are dried with the multiple effect use of the heat required by adding recycled cool high boiling oil and heating the mixture by direct contact with steam produced as later described. Then the oil sludge mixture has water separated off which is possible, since water has been added by the direct condensation of steam in the heating of the mixture plus any extra original water in the sludge that can be removed by a centrifuge. The mixture is heated again by adding hot oil and then the mixture has water evaporated off by reducing the pressure. This steam produced is used for the direct steam heating mentioned above. Then water vapor is evaporated off again by reducing the pressure again and this water vapor is condensed by a water cooled condenser. In this way water vapor is evaporated off with the double use of heat. By indirect heat exchange of separated warm water with oil plus dried solids being heated sensible heat losses are kept small.

4 Claims, 1 Drawing Figure

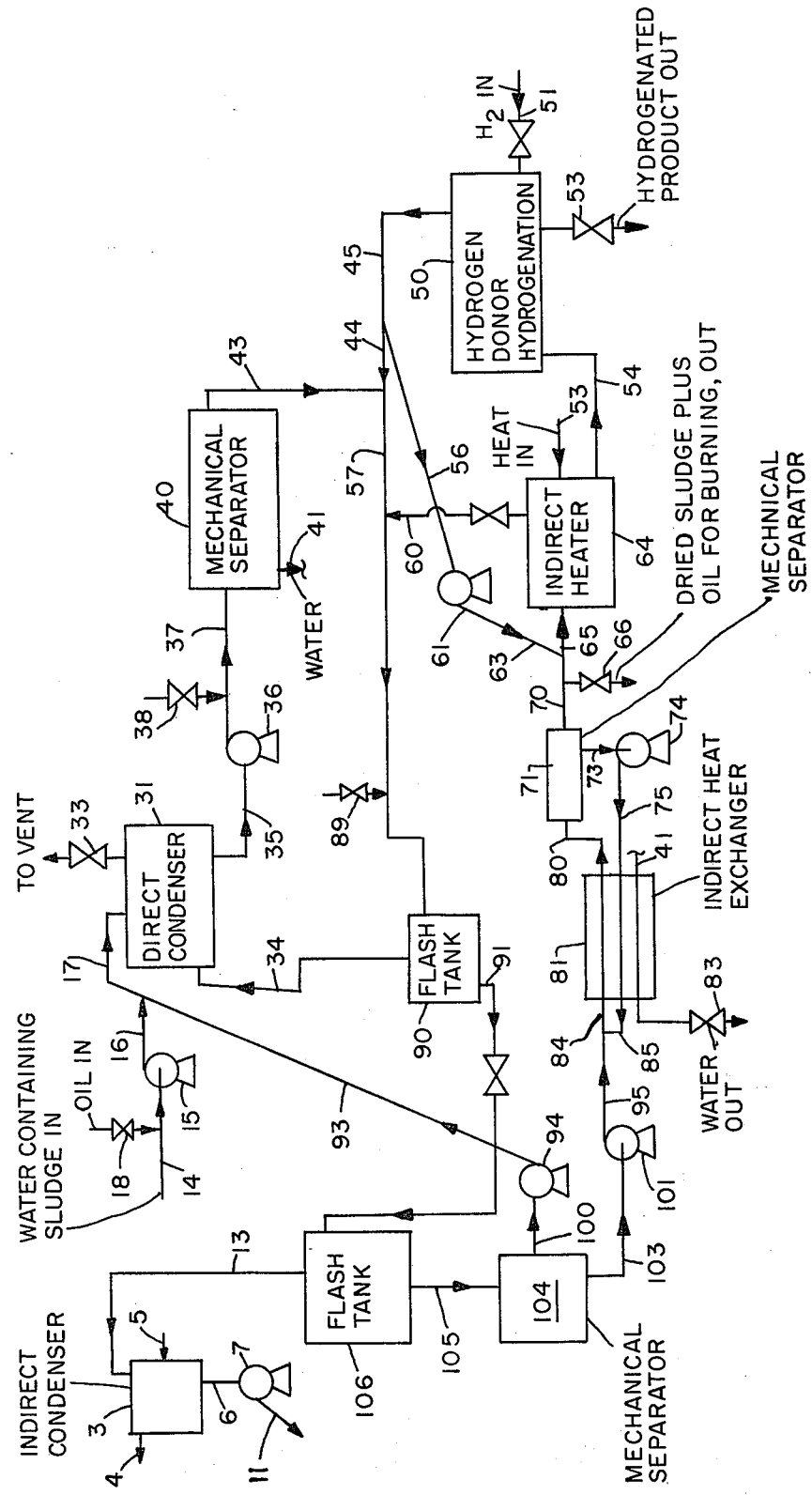

MULTIPLE EFFECT EVAPORATION OF WATER FROM WATER CONTAINING COMBUSTIBLE SLUDGES

This application is a continuation of parent application 618,048, filed 09/30/75 now abandoned.

The dried solids plus a relatively small amount of already warmed oil is heated again by indirect heat exchange and, by having the oil be a hydrogen donor hydrocarbon that has been hydrogenated, the solids may be hydrogenated besides thermally cracked to materials that are separated from the oil and are valuable. The residual oil is hydrogenated and supplies the hot oil stream above mentioned for heating the main stream of oil.

Where large amounts of water containing materials like peat are dried as many as eight stages can be used with the savings of at least 80% of the heat normally used for drying.

The state of the art of drying water-containing combustible sludges can be summarized by the following statement from *Industrial Pollution Handbook*, New York, McGraw-Hill, 1971, pages 6–25. It says "Sludge disposal is one of the major unresolved problems in water pollution today." For a wide variety of sludges, like the sludge filtered off from sewage and that of garbage, the basic problem of a sludge is that, while it contains a considerable amount of combustible material that could be used for many purposes, it also contains large quantities of water that cannot be economically removed by present processes. The same also applies to the enormous deposits of peat or partially decayed vegetation that have accumulated in very shallow lakes in northern rainy areas. In the United States there is estimated to be 13.7 billion tons of peat (if it were dried) that would be a wonderful raw material for various types of ways to solve the Energy Shortage. The material can be gathered at a small fraction of the gathering cost of any other source of fuel but there has been no practical way to dry it. (See *Mineral Facts and Problems*, U.S. Bureau of Mines Bulletin 650, 1970 Edition, page 139.) The only commercial method that has ever been devised and hence the only one ever used on any scale has been to dry the peat in the sun. This process of sun drying has only been used where the selling price has been high in this country with the product used in very small quantities for gardens and flowers. Use for fuel has been limited to countries like Ireland and Russia where labor is cheap and competitive fuels expensive. (See above Mineral Facts and Problems, U.S. Bureau of Mines Bulletin 650, 1970 Edition reference pages 145–146).

The object of this invention is to provide a low cost method for removing water from peat, garbage, sewage sludges and other combustible water containing sludges in low cost equipment so they can be burnt, thermally decomposed or hydrogenated to valuable materials. In this disclosure is disclosed a method for obtaining profitable usage of sludges containing as much as 95% water. For example peat contains in nature about 90–95% water and will only drain to roughly 87 to 88% water. (See above reference page 145.)

The drawing illustrates a form of the invention which a double effect use of the heat is used to evaporate the water in the sludge. This would be for a case like where it was desired to dry a relatively small amount of sludge which initially contained say 70% water. In very large applications, and especially with sludges like peat containing over 85% water, as many as 5 to even 8 effects or uses of the heat would be preferred with the water evaporated by the disclosed process with as little as 17% of the heat, required for simple evaporation, used to dry the sludge. It is assumed that the dried sludge in the drawing is either burnt mixed with oil, thermally decomposed in the oil with the production of desired products, or while mixed with the oil hydrogenated to desired products.

Referring to the drawing we see at 31 a direct condenser, where the sludge entering at 14 and oil entering at 18 pumped by pump 15 through pipe 16 to where it joins recycle oil flowing in pipe line 93 and the combined three liquid streams flow by pipe line 17 into the direct condenser 31. Here the combined streams are heated by vapors, normally about all steam, entering direct condenser 31 by pipe line 34. Direct condenser 31 is a conventional vapor-liquid contacting device such as a packed column where the steam entering by pipe line 93 directly contacts the cooler slurry entering by pipe line 17 with the steam condensing to water which mixes into the slurry. Uncondensed gases are removed from direct condenser 31 by valved pipe line 33 to a conventional vent system not shown.

The heated slurry produced in direct condenser 31 flows by pipe line 35 to pump 36 which pumps it by pipe line 37 to mechanical separator 40. Mechanical separator 40 is a conventional device to separate out the water from the slurry by mechanical means, that is not by evaporation. Mechanical separator 40 may be a vacuum filter or a centrifuge or other similar device followed by conventional oil-water separation equipment like a gravity or centrifuge settler. It is to be noted that first settling, or centrifuging, water in the sludge processed to any high degree before it enters at 14 is not necessary or even desirable. This is because that in the presence of oil many sludges such as peat will preferentially wet the solid particles and displace and so help remove the water. Also at higher temperatures liquids are less viscous and will flow faster from solid particles.

The water that can be mechanically removed from the sludge is removed at 41 to later have its sensible heat recovered in indirect heat exchanger 81 as will be later described.

The mixture of oil and solids, plus considerable of the water initially entering at 14 with the sludge, passes from mechanical separator 40 by pipe line 43 to where it combines first with hot recycle oil flowing in pipe line 44 and hot oil recycle, plus some steam, flowing in pipe line 60, to flow in pipe line 57 to flash tank 90. There the heat the sludge gets from the added hot oil stream results in evaporating water as steam from the sludge. Flash tank 90 is a vessel where there is good mixing of the hot oil with the wet or moist sludge. Normally the steam evaporating will supply the mixing if the sludge particles are relatively small as can be provided by milling or coarse grinding initially if necessary for the sludge. The steam formed passes, as has been mentioned, by pipe line 34 to direct condenser 31 and the liquid flows by valved pipe line 91 to flash tank 106 where the same procedure as has been described in flash tank 90 occurs again though at a lower absolute pressure.

The vapors, which normally are all steam, produced in flash tank 106 flow by pipe line 13 to conventional indirect condenser 3 where they are condensed by cold water entering at 5 and leaving at 4. The water condensate is removed by pipe line 6 to pump 7 and is pumped out of the system through pipe line 11. (It is assumed a condensate pump is used that also removes any noncondensable gases.)

The liquid slurry from flash tank 106 has its solids with a low water content. These dried solids along with the oil it is in pass by pipe line 105 to mechanical separator 104 which uses mechanical means like gravity settling to produce a relatively solids free oil stream which passes by pipe line 100, pump 94 and pipe line 93, as mentioned previously, to direct condenser 31. The concentrated solids in its oil fraction passes by pipe line 103, pump 101, pipe line 95 and pipe line 84 to be heated in indirect heat exchanger 81 which latter is of the conventional type. The concentrated slurry is usually diluted before it enters the indirect heat exchanger 81 by a stream of oil from pipe line 85 to remove any possibility of plugging the heat exchanger 81. Water that has been removed from the sludge, entering indirect heat exchanger 81 from pipe line 41, is cooled with heat recovery and leaves the system by valved pipe line 83.

The heated oil plus its dried solid content passes from indirect heat exchanger 81 by pipe line 80 to mechanical separator 71 where the oil recycled just mentioned is separated from a stream of oil containing a greater concentration of solids. This recycled oil passes by pipe line 73 and pump 74 by pipe line 75 to indirect heat exchanger 81 as previously mentioned. (It is to be noted that this stream seldom needs to be large and with some sludges can be omitted.) Introducing more water with the sludge at 14 produces the same net result.)

The solids plus remaining oil passes from mechanical separator 71, which is of conventional design, by pipe line 70 and if it is to be burnt while mixed with oil leaves the system by valved pipe line 66. In this case we have a relatively dried mixture of solids with the oil and as a result the net heat obtained from a material like garbage or sewage sludge is relatively high per pound of solids as compared with the net heat obtained from the normally wet sludges where the heat required for evaporating the large amount of accompanying water must be taken from the final heat obtained.

However normally the sludges dried have considerable value for processing into premium materials by processes like thermal decomposition and hydrogenation. Therefore the dried solids are normally preferred to be all further processed by passing them with oil through pipe line 65 into indirect heater 64. In indirect heater 64 heat is added at 55 which normally is some steam made by burning part of the final product or it may be solar heat such as is supplied by applicant's patent application filed Aug. 21, 1975., Ser. No. 606,424.

The heated oil passed by pipe line 54 to hydrogen donor hydrogenation step 50 where the solids are hydrogenated by the hydrogen donor method in which hydrogenated-aromatic-normally- high-boiling hydrocarbons are added. This hydrogenation method is conventional and has long been practiced for various materials commercially. The hydrogenated aromatic hydrocarbons easily lose hydrogen which hydrogenates the solids and oils, which the solids have cracked to, under appropriate temperatures and pressures. The process normally can be accompanied with much thermal cracking of the solids to coke like products which have the advantage they are reduced in volume and can be filtered out from the oil in a concentrated sludge or slurry and burnt or gasified by steam at high temperatures. Some volatile products are always obtained too and these can be distilled off with all the operations described in this paragraph being of conventional and previously used operations though the optimum and obvious combination and modifications of the operations will vary with the specific sludge solids processed. It is emphasized that all the common combustible sludges are quite reactive and can be considered much more reactive than coal. Coal itself normally would not be hydrogenated by the hydrogen donor process but for coal other methods of sludge solids disposal are quite practical, such as burning when dried and mixed with oil, when it desired to dry finely powdered coal slurries such as can be so cheaply transported by pipe line in a water slurry.

Of course the final step in hydrogen donor hydrogenation is always hydrogenating the residual aromatic oil after it has lost part of its hydrogen in the hydrogenation process so the aromatic oil can be recycled and used again. The products obtained from the dried sludge solids are shown removed by valved pipe line 53.

It is to be noted that even if it is only desired to burn the dried sludge solids while mixed with oil leaving at valved pipe line 66, some of the oil is preferably sent through indirect heater 64 from pipe line 65 to supply heat the process needs. This heated oil passes by valved pipe line 60 to pipe line 57. However the needed heat can be supplied by steam entering at 38. This latter has the disadvantage that condensate of high purity will not be obtained to use for boiler feed water for a high pressure steam boiler to make more steam.

The residual oil not taken as product in hydrogen donor hydrogenation step 50 passes on in pipe line 45 where part is separated off by pipe line 56 to be recycled by pump 61 and pipe line 63 to pipe 70 to make concentrated solids in oil in pipe line 65 more fluid when it is heated by indirect heater 64. The rest of the oil in pipe line 45 passes by pipe line 44 where it is joined by the oil plus moist solids flowing in pipe line 43 and the combined streams flow by pipe line 57 to flash tank 91 previously mentioned.

It is to be noticed that the temperature of the water containing sludge may vary with different sources of sludge or different temperatures of the weather and as a result will enter the process at different temperatures. Therefore the sludge is preferably pumped into the process at a location where the oil it mixes with at close a temperature as possible to the temperature of the entering sludge. For example it can be introduced preferably in some cases at 89 where it is also assumed that the sludge has been first been partially dewatered by a vacuum filter or other equally effective mechanical dewatering means.

However in all cases the water containing sludge enters the system and is mixed with oil before the pressure reduction steps of the process (flash tanks).

It is to be noted, that in previous systems, water containing solids have been treated in hot oil first to remove the water by simple distillation without heat recovery and then heated in the oil with thermal cracking and at times with hydrogenation of the hydrogen donor type with the production of a greater amount of liquid products (Russian laboratory work on peat discloses the latter.) However as far has been known or can be found such processes have never been used commercially which is obvious when one calculates the amount of the final products produced that must be burnt to provide the heat needed to evaporate the water in the available sludges. As the U.S. Bureau of Mines reference quoted at the start of the disclosure states the only practical and commercially used method of using peat for example requires the expensive sun drying of the peat first.

However in the drawing is disclosed a method that the amount of heat required for drying the sludge is reduced by almost 50% yet only very low cost equipment is used. Also obviously more than just two stages of flashing or pressure reduction can be used in series and the same heat saving effect as in multiple effect evaporators now used on solids-free liquids commercially on a large scale can be obtained with as many as 7 or more stages saving over 80% of the heat required by single effect use of heat. Since the disclosed process does not require the enormous areas of heat exchange surfaces as prior double effect evaporators now used for just liquids the possiblilities of using large numbers of stages in very large systems are very profitable. It is noted that it is possible that the only heat supplied to the process may in some cases be just the heat given off on hydrogenating the dried solids.

With some types of sludges here can be the problem of partially dried sludges sticking to the equipment. The sticking happens when the water content of certain types of solids pass through certain moisture contents. A very well known example of this in the field of soils is that when a farmer walks through a plowed field that has been rained on here in the Corn Belt is the way the soil will stick to his boots. For example when it has just rained and the soil is very wet it will not stick on bad. But as it dries partially each type of soil, that is the clay soils and the different old swamp soils, will stick much worse as it passes through some own particular water content. This checks with applicant limited experience with other water containing sludge or sludge like materials. This amount may vary and troubles with sticking have not been serious with processes experimentally tried out by others for peat which is the very big use of the disclosed process but the problem of sticking must always be kept in mind. But it is emphasized that the disclosed process should handle sticking solids quite easily when designed to handle sticking materials. As compared with other possible types of multiple effect drying the disclosed process can be designed with provision of manual or preferable automatic mechanical cleaning devices at the critical places and storage can be provided so the sticky stage sludge can be mixed with dried solids that have been recycled so as to get the sticky solids through the sticky stage. In a systems with the usual required enormous areas of tubes that must contact sticky sludges such design is impossible.

It should be added that the lining of vessels with plastic sheets made of plastics that have a very high fluorine content have been very successful in solving problems involving sticking and this while expensive per square foot of surface covered can be afforded by apppicant's process and not by competitive multiple effect processes for drying sludges with their large areas where sticking can occur.

Also some sludges have solids that decompose with the production of acids. Peat at high temperatures will have decomposition products that contain acetic acid. The absence of the great areas of metal tubes normally present in multiple effect evaporating systems greatly reduces the cost of providing equipment for applicant's process that will stand the corrosive substances that may be encountered in drying sludges. For example it is desirable to hydrolyze cellulose in paper trash to sugars by concentrated hydrochloric acid. These are only with difficulty leached out from the lignin particles that remain and it is desirable to neutralize the last traces of the hydrochloric acid with lime. But this forms calcium chloride that is corrosive to metal. Obviously a system that can be economically made to withstand such corrosion is greatly preferred. In bad cases most of applicant's equipment can be made of acid resistant rubber lined steel equipment at a bearable cost.

It is emphasized that the cost of drying the sludges has been lowered so much by the disclosed process that the kind of water insoluble oil, used in the process for drying for large scale drying, will usually be selected much more on the basis of availability and the way it fits in with the use of dried sludge solids rather than its efficiency as a drying agent. Normally one would not expect oils boiling as low as water to be used since they also will evaporate in the process and as a result lower the overall efficiency of the drying process. But this lowering of the efficiency still does not prevent obtaining a drying process far superior to previous drying processes while other advantages are obtained. As for example the use of a gasoline fraction with roughly the same boiling point as water will provide a final dried sludge containing hydrocarbons with on a volume basis a heat of evaporation of only 9.5% of that of water. So if you take the final sludge solids from the system, with water removed and containing a volume of hydrocarbons equal to the volume of water originally present, just mixing the liquid gasoline fraction-dried sludge with superheated gasoline fraction vapors is a very low cost method for evaporating the gasoline fraction from the solid particles. By passing the solid particles suspended in the vapors through a cyclone dust separator a solids fraction can be obtained that contains only a small amount of gasoline which provides dried sludge solids to burn at low cost even if the cost of the gasoline fraction you use and later burn a small amount of is high.

In this patent the term "mechanical separation" or to "remove mechanically" is defined as any type of separation in which physical force is directly used to effect the separation. The physical force may be applied by machines or even the force of gravity but heat is not used in the separation to evaporate substances.

In conclusion it is stated that a practical method in which water containing combustible solids, like sewage sludge, garbage, peat, and finely ground coal mixed with water can be dried in low cost equipment with the use of greatly reduced amounts of heat so that the drying and burning, thermal decomposition or hydrogenation of these very cheaply available water containing combustible sludges becomes very profitable has been disclosed.

I claim:
1. A process for recovering combustible solids of vegetable origin from water wet combustible concentrated solids, comprising the steps of:
   (a) pumping both water wet combustible solids and a preheated water insoluble liquid that is also a liquid at the condition of pressure and temperature in each of steps mentioned in this claim to a vapor and liquid contacting vessel,
   (b) feeding a stream containing steam to said vapor and liquid contacting vessel and mechanically mixing the steam just mentioned and the concentrated solids and the water insoluble liquid mentioned in step (a),
   (c) withdrawing at least a first stream comprising water, said water insoluble liquid and said solids, from the vapor and liquid contacting vessel mentioned in steps (a) and (b),
(d) pumping said first stream, mentioned in step (c), to a first mechanical separator.
(e) mechanically separating said first stream mentioned in step (d) into a stream consisting essentially of water and a second stream comprising water, water insoluble liquid and said solids, whereby said second stream is substantially reduced in water content relative to said first stream,
(f) feeding said second stream, mentioned in step (e), to a first flash tank and flashing said second stream to a first reduced pressure within said first flash tank, thereby to yield an overhead stream comprising steam and a third stream comprising water, water insoluble liquid and said solids, whereby said third stream is further substantially reduced in water content relative to said second stream,
(g) feeding said third stream, mentioned in step (f), to a second flash tank and flashing said third stream to a second reduced pressure, whereby said reduced pressure is lower than said first reduced pressure, mentioned in step (f), thereby to yield an overheated stream comprising steam and a fourth stream comprising water, water insoluble liquid and said solids, whereby said fourth stream is further substantially reduced in water content relative to said third stream,
(h) feeding said fourth stream, mentioned in step (g) to a second mechanical separator,
(i) mechanically separating said fourth stream, mentioned in step (h), into a stream comprising said water insoluble liquid and a fifth stream comprising said solids and said water insoluble liquid, whereby the water insoluble liquid content of said fifth stream is substantially reduced relative to the water insoluble liquid content of said fourth stream,
(j) withdrawing at least a portion of said fifth stream, mentioned in step (i), as product. Passing at least another portion of said fifth stream to a heat exchange zone wherein this last mentioned portion of the first stream is first heated and then mixed with the second stream, which was mentioned as produced in step (e), before the second stream passes to the first flash tank as mentioned in step (f),
(k) recycling said water insoluble liquid stream mentioned in step (i) to a point in said process downstream of said first mechanical separator, as mentioned in step (d), as upstream of said first flash tank, said water insoluble liquid stream being at least part of the water insoluble liquid stream mentioned in step (a),
(l) And hydrogenating solids, while contained, in a portion of the fifth liquid stream, with the formation of a hydrogenated water insoluble fraction being formed which is at least partially recycled to the process as the water insoluble liquid previously mentioned.

2. The process of claim 1, wherein the boiling point of the water insoluble liquid at 760 mm. of mercury absolute pressure is over 150° C.

3. The process of claim 1 wherein the concentrated solids of vegetable origin are peat.

4. The process of claim 1 wherein said water insoluble liquid is comprised of at least 80 wt. % of hydrocarbons.

* * * * *